(12) United States Patent
Holm et al.

(10) Patent No.: US 8,874,684 B2
(45) Date of Patent: Oct. 28, 2014

(54) FACILITATING SUBSCRIPTION SERVICES IN THE IMS

(75) Inventors: Tomas Holm, Älvsjö (SE); Catherine Mulligan, Stockholm (SE); Hans Nordin, Tullinge (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 568 days.

(21) Appl. No.: 12/865,305

(22) PCT Filed: Jan. 30, 2008

(86) PCT No.: PCT/EP2008/051145
§ 371 (c)(1),
(2), (4) Date: Aug. 17, 2010

(87) PCT Pub. No.: WO2009/095075
PCT Pub. Date: Aug. 6, 2009

(65) Prior Publication Data
US 2010/0332614 A1    Dec. 30, 2010

(51) Int. Cl.
G06F 15/16      (2006.01)
H04L 29/08     (2006.01)
H04L 29/06     (2006.01)
G06F 15/173    (2006.01)
H04L 29/12     (2006.01)

(52) U.S. Cl.
CPC ........ H04L 65/1063 (2013.01); H04L 67/1002 (2013.01); H04L 61/1588 (2013.01); H04L 29/12188 (2013.01); H04L 67/28 (2013.01); H04L 67/20 (2013.01); H04L 67/1031 (2013.01); H04L 67/1029 (2013.01)
USPC ........... 709/217; 709/218; 709/219; 709/222; 709/226; 709/227; 709/228

(58) Field of Classification Search
CPC ............... H04L 29/12188; H04L 61/1588; H04L 65/1063; H04L 65/1006; H04L 65/1016; H04L 67/1063; H04L 67/1002; H04L 67/1029; H04L 67/1031; H04L 67/20; H04L 67/28; H04L 67/14; H04W 80/10
USPC .................. 709/217–219, 222, 226–228
See application file for complete search history.

(56) References Cited

U.S. PATENT DOCUMENTS

2004/0205212 A1* 10/2004 Huotari et al. ............... 709/230
2007/0159976 A1*  7/2007 Dekeyzer et al. ............ 370/236

(Continued)

FOREIGN PATENT DOCUMENTS

WO    WO2008059028    * 11/2007

OTHER PUBLICATIONS

"Digital cellular telecommunications 1-11 system (Phase 2+) ; Universat Mobile Telecommunications System (UMTS) ; IPMultimedia Subsystem (IMS) Sh interface; Signalling flows and message contents (3GPP TS 29.328 version 7.8.0 Release 7); ETSI TS 129 328" ETSI Standards, LIS, SOPHIA Antipolis Cedex, France, vol. 3-CN4, No. V7.8,0, Jan. 1, 2008, XP014040687.

(Continued)

*Primary Examiner* — Alina N Boutah

(57) ABSTRACT

A method of starting a third party application subscription in a set of Application Servers located within an IP Multimedia Subsystem network. The method comprises receiving a subscription start request at one of said Application Servers, the request including subscription data, starting the subscription data at that Application Server, and storing the subscription data as transparent data in a Home Subscriber Server, from that Application Server over the Sh interface.

8 Claims, 6 Drawing Sheets

(56) References Cited

U.S. PATENT DOCUMENTS

| | | | |
|---|---|---|---|
| 2008/0008195 A1* | 1/2008 | Oberle et al. | 370/401 |
| 2008/0102844 A1* | 5/2008 | Zhu et al. | 455/445 |
| 2008/0104696 A1* | 5/2008 | Ll et al. | 726/21 |
| 2008/0195535 A1* | 8/2008 | Liu | 705/39 |
| 2008/0215736 A1* | 9/2008 | Astrom et al. | 709/226 |
| 2008/0305794 A1* | 12/2008 | Mukaiyama et al. | 455/435.1 |
| 2009/0098861 A1* | 4/2009 | Kalliola et al. | 455/414.1 |
| 2009/0132717 A1* | 5/2009 | Maes | 709/228 |
| 2009/0164591 A1* | 6/2009 | Chadli | 709/206 |
| 2011/0028130 A1* | 2/2011 | Swaminathan et al. | 455/414.1 |
| 2011/0111734 A1* | 5/2011 | Walker et al. | 455/414.1 |

OTHER PUBLICATIONS

"Universal Mobile Telecommunications System (UMTS); Open SeNice Access (OSA); Stage 2 (3GPP TS 23.198 version 7.3.0 Release 7); ETSI TS 123 198" ETSI Standards, LIS, Sophia Antipolis Cedex; France, vol. 3-CT5, No. V7.3.0, Jan. 1, 2008, XP014040560.

* cited by examiner

FACILITATING SUBSCRIPTION SERVICES IN THE IMS

TECHNICAL FIELD

The present invention relates to facilitating subscription services in the IP Multimedia Subsystem and in particular, though not necessarily, to facilitating subscription services which allow a service provider to subscribe to events occurring at SIP Application Servers.

BACKGROUND

IP Multimedia services provide a dynamic combination of voice, video, messaging, data, etc. within the same session. By growing the number of basic applications and the media which it is possible to combine, the number of services offered to the end subscribers will grow, and the inter-personal communication experience will be enriched. This will lead to a new generation of personalized, rich multimedia communication services, including so-called "combinational IP Multimedia" services.

IP Multimedia Subsystem (IMS) is the technology defined by the Third Generation Partnership Project (3GPP) and ETSI TISPAN group to provide IP Multimedia services over mobile communication networks (3GPP TS 22.228, TS 23.228, TS 24.229, TS 29.228, TS 29.229, TS 29.328 and TS 29.329 Releases 5 to 7, and TS 24.173 Release 7). IMS provides key features to enrich the end-subscriber person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between subscriber terminals (or subscriber terminals and application servers). The Session Description Protocol (SDP), carried by SIP signalling, is used to describe and negotiate the media components of the session. Whilst SIP was created as a subscriber-to-subscriber protocol, IMS allows operators and service providers to control subscriber access to services and to charge subscribers accordingly.

By way of example, FIG. 1 illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the subscriber and which the subscriber is subscribed to; and the Interrogating CSCF (I-CSCF) whose role is to identify the correct S-CSCF and to forward to that S-CSCF a request received from a SIP terminal via a P-CSCF.

Within the IMS service network, Application Servers (ASs) are provided for implementing IMS service functionality. Application Servers provide services to end users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment (or indeed for the purpose of any SIP method, session or non-session related). The IFCs are received by the S-CSCF from a Home Subscriber Server (HSS) during the IMS registration procedure as part of a subscriber's Subscriber Profile.

Whilst early IMS implementations relied upon the static allocation of ASs to subscribers, i.e. with the ASs identities being specified in the IFCs for that client, more recently it has been recognised that this is undesirable both to ensure load sharing across ASs and to provide a measure of fault tolerance, i.e. backup in the event that an AS fails. Consider for example the Multimedia telephony (MMTel) IMS service. This can be deployed (across a given IMS network) on many ASs, and as such ASs can be dynamically allocated to users. A user's application data is fetched from the HSS transparent data at user IMS registration and cached in the dynamically allocated AS. At user deregistration the AS discards the user's cached application data.

There are a number of possible mechanisms for dynamic AS allocation. One example involves the S-CSCF resolving, at registration, a generic service AS identity received from the HSS into a specific AS identity, e.g. using a DNS lookup type operation. Another example involves some sort of AS pool front-end that receives a registration request from the S-CSCF at user registration, the front-end selecting one AS from the pool and forwarding the request to that AS. This front-end may subsequently route SIP traffic to the allocated AS based upon an association between the user identity and AS instance.

It has been widely recognised that it is desirable to provide an interface between telecommunications networks and third party provider applications, e.g. via a web graphical user interface (e.g. the W3C defined Web Services), in order to allow telecom functionality and services to be available over the web. For example, it might be desirable to allow a user to initiate a call to a company by clicking on a link on the company's web page ("click-to-dial"). In the case of the IMS, the 3GPP defined interface known as Parlay X can be used to interface an AS to a third party service provider application. This interface provides functionality to manage, i.e. start and stop, "subscriptions" belonging to the service provider application. A subscription is defined by

- 1 or many IMS users (PUI) to which the subscription relates;
- 1 or many call events (e.g. new call, busy);
- a notification address of the service provider application; and
- a subscription identity (used for example when the subscription is stopped).

When an AS has started a subscription, and handles a call that matches the criteria (PUI+call event) specified in the subscription, it uses the notification address to send a trigger to the service provider application. A service provider may start subscriptions within the IMS network on a per user basis. However, it is more likely that a subscription will be started for a set of users, e.g. one subscription identifying all users subscribing to a particular service.

A third party service provider application will typically be pre-configured with an IP address and port number of an IMS AS with which it is to communicate (e.g. via the Parlay X interface). Alternatively, the service provider application may be preconfigured with a URL of the AS, with the service provider application resolving the URL into an IP address and port number using a DNS look-up or the like.

In view of the likely dynamic allocation of ASs (in respect of a given service, e.g. MMTel) to users, a service provider application cannot have a priori knowledge of the ASs to which users associated with a given subscription will be allocated. Moreover, different subscribers may be allocated to different ASs belonging to a service pool. As such, a subscription must be distributed to all relevant ASs in the IMS network which can be allocated to a user. Furthermore, when the subscription is stopped, it must be removed from all ASs. FIG. 2 illustrates schematically the subscription process where a particular IMS service is facilitated by a pool of ASs, namely AS1, AS2 and AS3. Users X, Y and Z are allocated to the three ASs respectively. A third party application wishing to start a subscription in the IMS in respect of three users X, Y and V, must start it in all three ASs as X and Y are allocated to different ASs, and as an AS has not yet been allocated to user V.

One approach to starting the subscription in all ASs associated with a particular service is for the third party service provider application to start the subscription directly in each AS. The service provider application could obtain the addresses of the requisite ASs by performing a DNS look-up on a generic AS URL. This is however undesirable due both to the load placed on the service provider application, and to the inability of such a mechanism to respond to dynamic changes in the AS, for example upon initialisation of a new AS for a particular IMS service.

SUMMARY

It is an object of the present invention to provide a mechanism for starting third party subscriptions across multiple ASs whilst at the same time requiring that a third party application server interface with only a single application server. This object is achieved by storing subscription data as transparent data in the Home Subscriber Server.

According to a first aspect of the present invention there is provided a method of starting a third party application subscription in a set of Application Servers located within an IP Multimedia Subsystem network. The method comprises firstly receiving a subscription start request at one of said Application Servers, the request including subscription data. That Application Server starts the subscription and also stores the subscription data as transparent data in a Home Subscriber Server over the Sh interface.

Embodiments of the invention ensure that the required subscription is started in all ASs that have access to the stored transparent data. In particular, following the storing of the subscription data as transparent data in the Home Subscriber Server, the subscription data is distributed from the Home Subscriber Server, to the or each other Application Server in said set, over respective Sh interface.

A particularly preferred embodiment of the invention involves sending the start request from the third party applications server to the Application Server over a Web Services interface, using a Parlay X interface.

According to a second aspect of the present invention there is provided a method of stopping a third party application subscription previously started in a set of Application Servers located within an IP Multimedia Subsystem network. The method comprises receiving a subscription stop request at one of said Application Servers and deleting the associated subscription data at that Application Server whilst updating the transparent data in a Home Subscriber Server by sending an instruction from that Application Server to the Home Subscriber Server over the Sh interface to delete said subscription data. The subscription data stored at each other Application Server in said set is deleted by sending a notification from the Home Subscriber Server to those Application Servers over respective Sh interface.

According to a third aspect of the present invention there is provided a computer program configured to carry out the method of any one of the above aspects of the invention.

According to a fourth aspect of the present invention there is provided apparatus configured to operate as an Application Server within an IP Multimedia Subsystem. The apparatus comprises a first interface for receiving a subscription start request, the request including subscription data, a memory and means for storing the subscription data in the memory, and a second interface for storing the subscription data as transparent data in a Home Subscriber Server over the Sh interface.

According to a fifth aspect of the present invention there is provided apparatus configured to operate as an Application Server within an IP Multimedia Subsystem. The apparatus comprises a first interface for receiving a subscription stop request, a memory for storing associated subscription data, and means for deleting the subscription data from the memory, and a second interface for deleting the subscription data stored as transparent data in a Home Subscriber Server, over the Sh interface.

DETAILED DESCRIPTION

A mechanism will now be described which allows a third party service provider application to start subscriptions in the Application Servers (ASs) of an IMS network. It is assumed that this application resides on a server operated by the service provider, with the server having a Parlay X (or other suitable) interface to the IMS.

It is proposed to store subscriptions as transparent data within the Home Subscriber Server (HSS) of the IMS network. Sh procedures are described in TS 29.328, from which it can be understood that transparent data is understood syntactically but not semantically by the HSS. It is data that an AS may store in the HSS to support its service logic. The data is identified by a specific Public User Identity (PUI) e.g. "mmtel-subscriptions@oper.net". The transparent data identified by the specific PUI holds all started subscriptions for a given IMS service. This means that an AS (preconfigured with the specific PUI) that obtains the transparent data for a specific PUI has all active subscriptions for the associated service. The management of the subscriptions can be handled by the AS using the Sh interface. In particular, each AS associated with a given service is able to update the subscriptions in the HSS. This means that any AS can handle the management request (e.g. start or stop) from the third party application.

Figure 1:
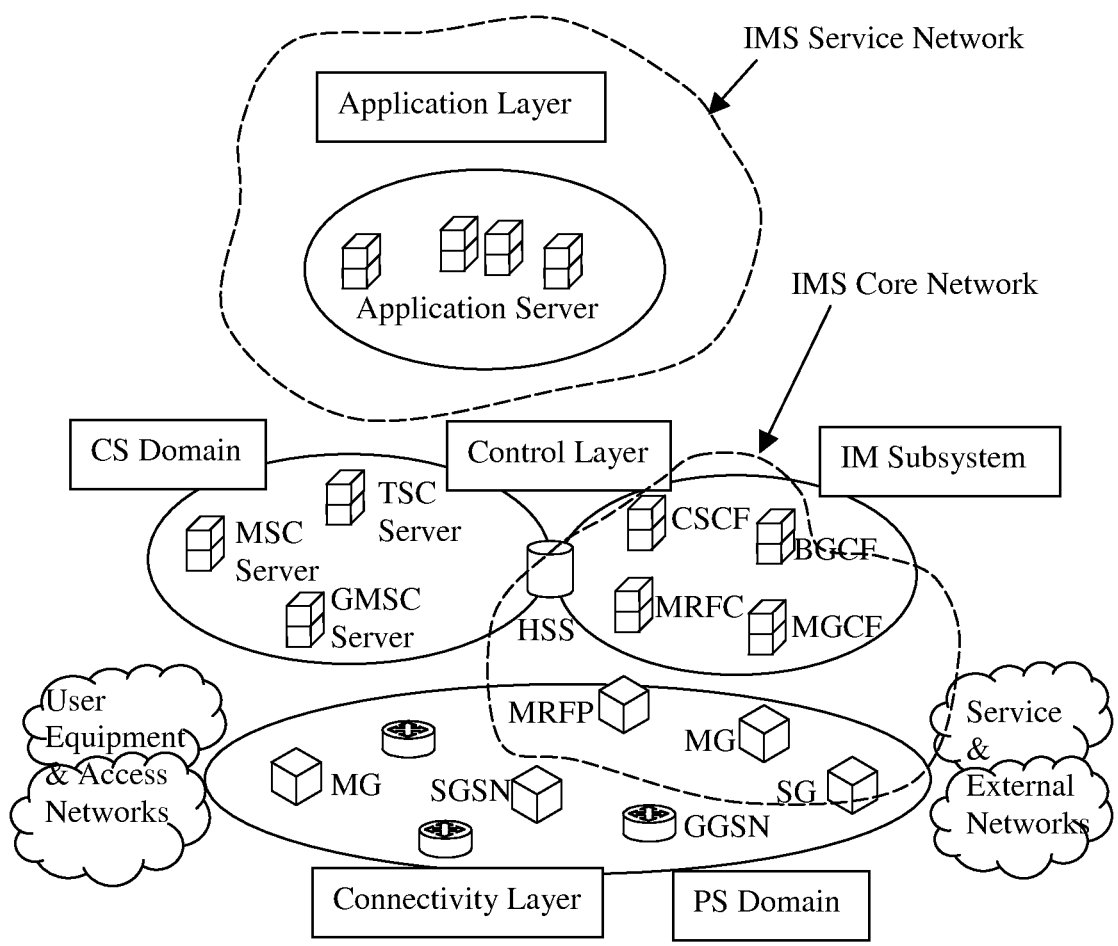
FIG. 1 illustrates schematically the integration of an IP Multimedia Subsystem into a 3G mobile communications system.
Figure 2:
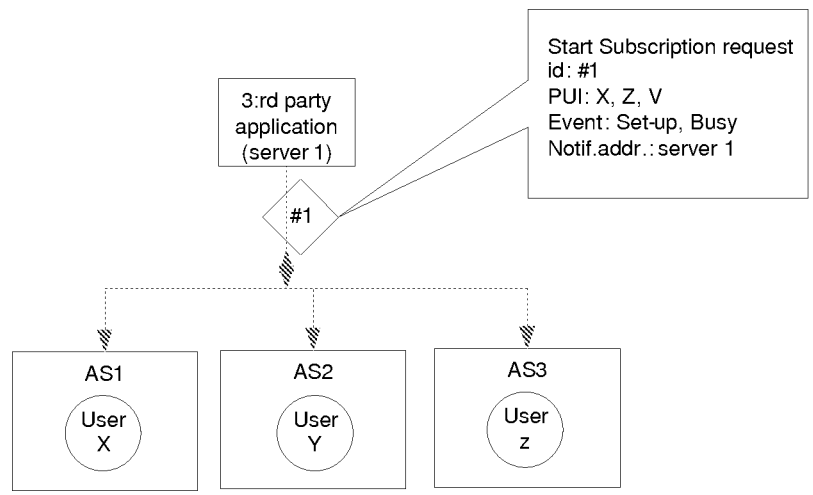
FIG. 2 illustrates a prior art approach to starting a third party application subscription in IMS ASs.
Figure 3:
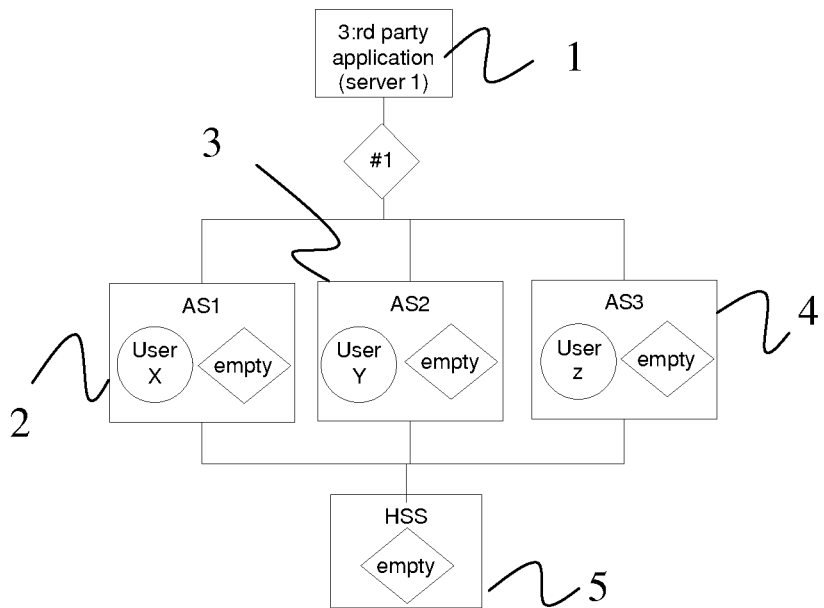
FIGS. 3 to 6 illustrates various states associated with starting a third party application subscription in IMS ASs according to an embodiment of the invention.

FIG. 3 illustrates schematically a third party application server, server 1, indicated by reference numeral 1, coupled to an IMS network comprising a set of ASs (AS1 to AS3) indicated by reference numerals 2 to 4, associated with a particular service, e.g. MMTel. It is assumed that the Parlay X interface is used between Server 1 and one or more of the ASs.

It is further assumed that Server 1 is preconfigured with an IP address and port number of a selected one of the ASs, e.g. AS1. In the state illustrated, no subscriptions have been started in the IMS by Server 1, and the subscription storage locations in the various ASs and in the HSS 5 (transparent data) are empty.

Figure 4:
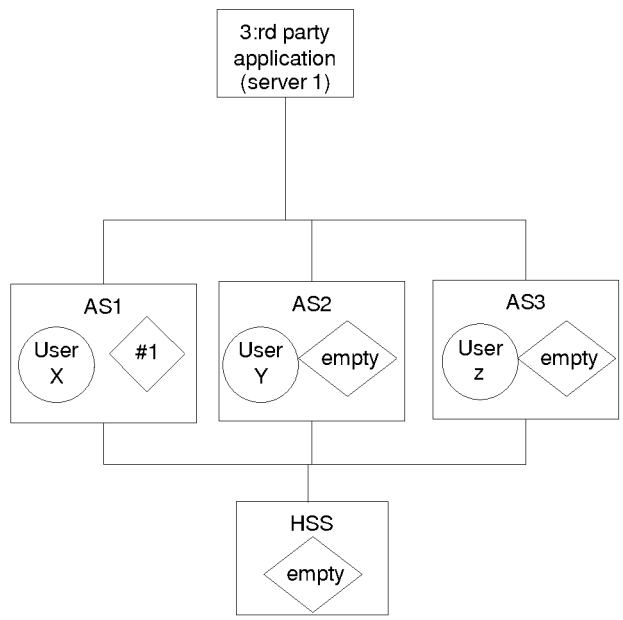
Figure 5:
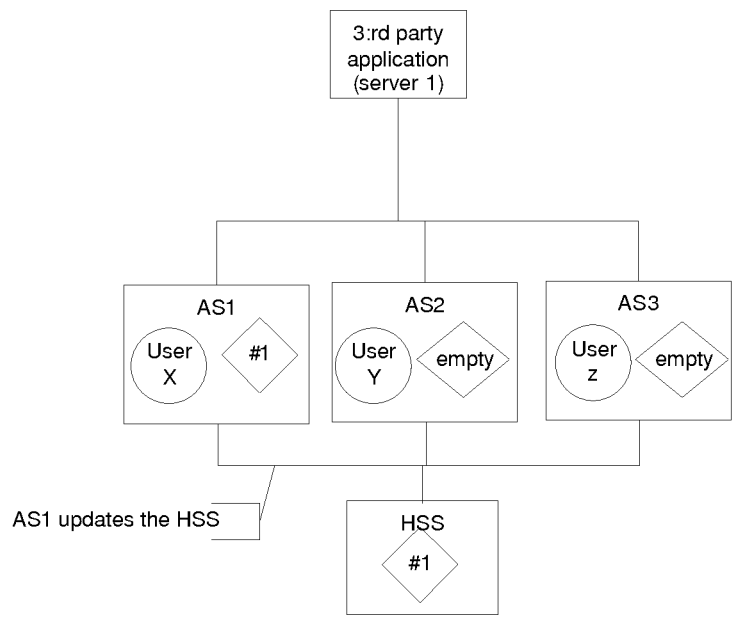

With reference now to FIG. 4, this Figure illustrates the case where the third party application server starts a subscription #1 in AS1, via the Parlay X interface. Although the Parlay X interface has no specific knowledge of the IMS service, i.e. MMTEel in this case, the service is implicitly defined by the IP address and port (or URL) to which start instruction is sent. As well as storing the subscription in its own subscription storage location, AS1 is configured to store the subscription data in the HSS as transparent data over the Sh interface (using the Sh-Update: TS 29.328). This next state is illustrated in FIG. 5. All three ASs will previously have subscribed (using the Sh-Subs-Notif: TS 29.328) to changes in the transparent data at the mmtel-subscriptions@oper.net PUI. As a result of this subscription, the HSS will notify AS2 and AS3 of the new subscription data (using the Sh-Notify) which will store the new data. This state is illustrated in FIG. 6.

Figure 6:
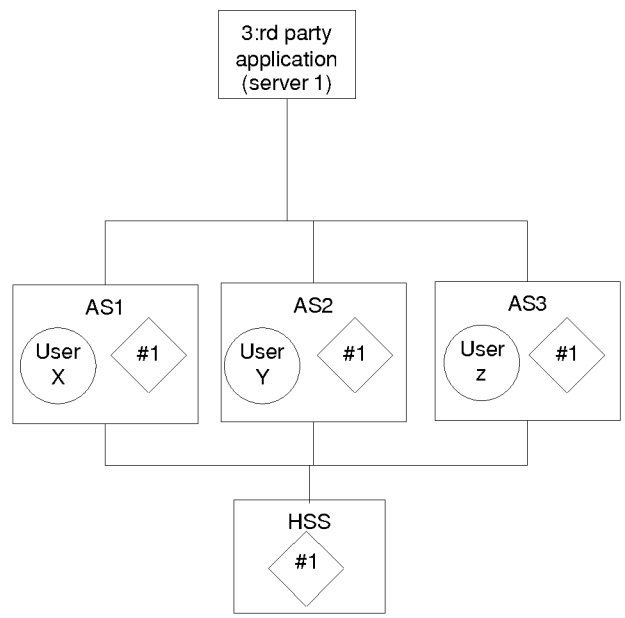

In the state illustrated in FIG. 6, all ASs associated with the IMS MMTel service possess the same subscription information, and any call that matches the subscription condition(s) will result in a notification being sent to Server 1.

Figure 7:
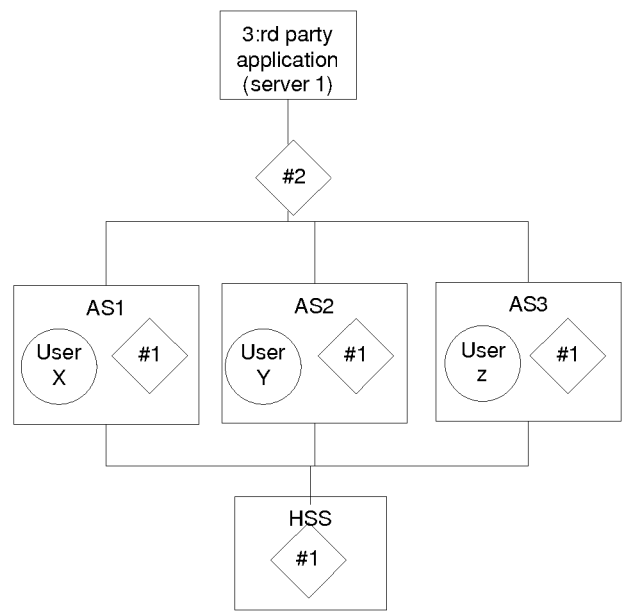
FIGS. 7 to 9 illustrate schematically various states associated with starting a second third party application subscription in IMS ASs according to an embodiment of the invention.
Figure 8:
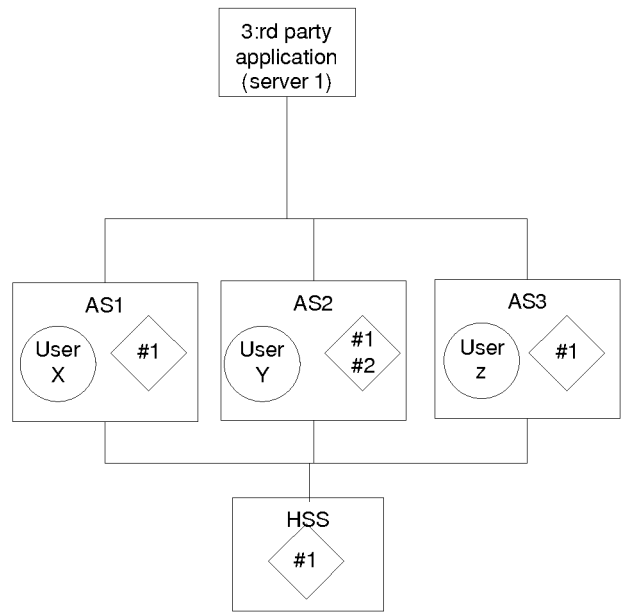
Figure 9:
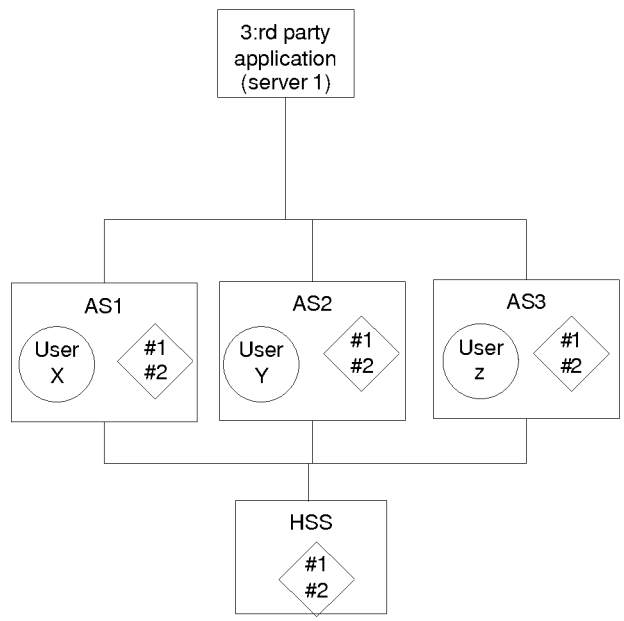

FIGS. 7 to 9 illustrates a subsequent case where Server 1 chooses to send a second subscription #2 to AS2. Again though, AS2 causes the transparent data in the HSS to be updated with the new subscription which in turn notifies AS1 and AS3.

Figure 10:
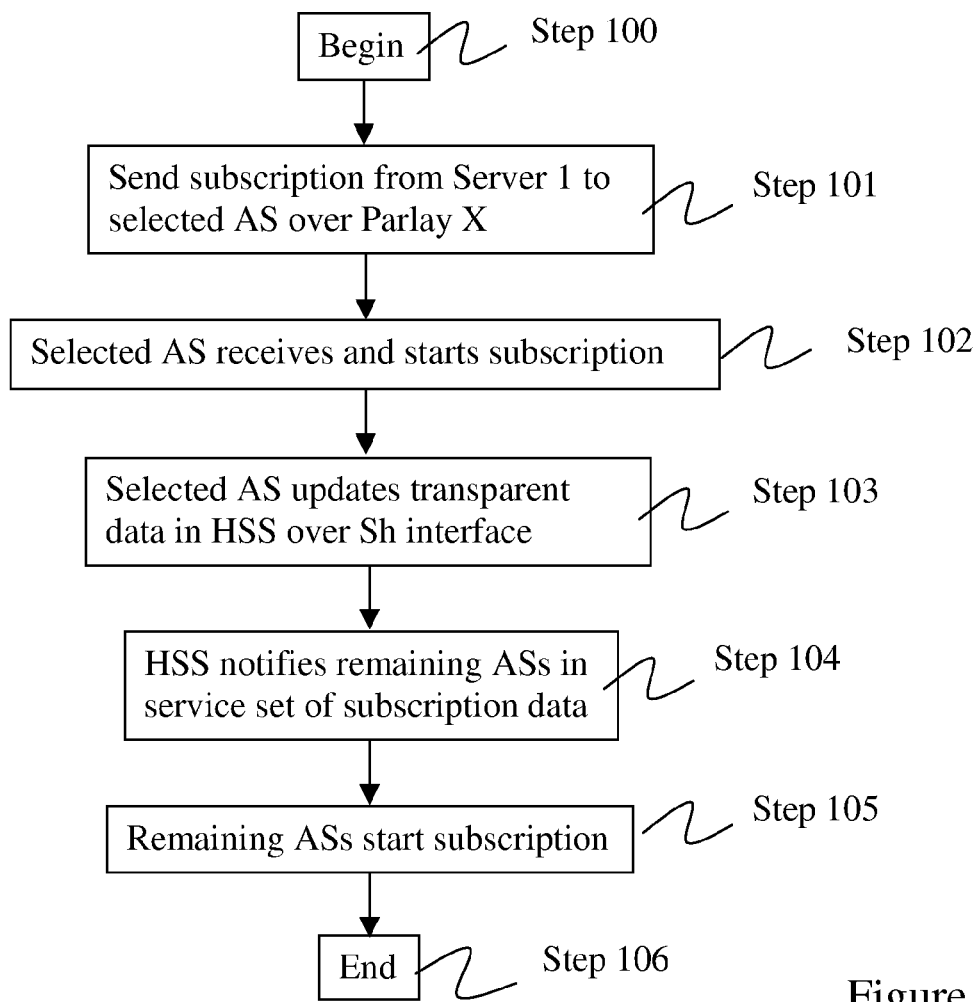
FIG. 10 is a flow diagram illustrating a process for starting a third party application subscription in a set of IMS ASs.

FIG. 10 is a flow diagram illustrating the process for starting subscriptions in the IMS ASs. Following initialisation of the process at step 100, a subscription start request is sent from the third party server to a selected AS at step 101. Then, at step 102, the AS receives and starts the subscription, whilst updating the transparent data stored at the HSS at step 103. At step 104, the HSS notifies the remaining ASs of the start request, whilst at step 105 those other ASs start the subscription before the process terminates at step 106.

Figure 11:
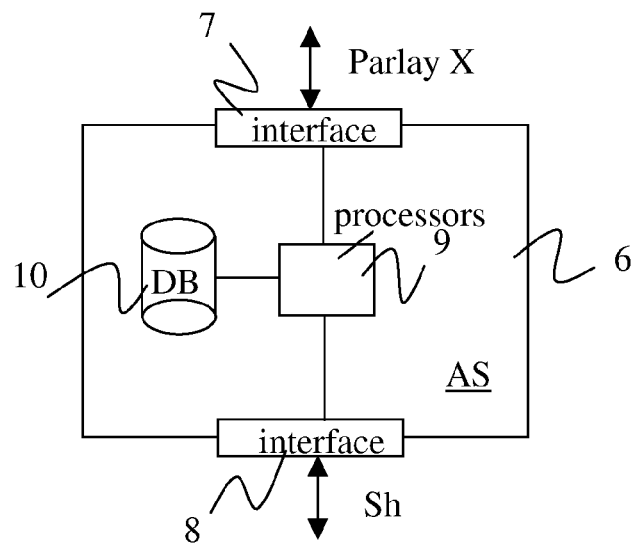
FIG. 11 illustrates schematically an IMS AS for use in the process of FIG. 10.

FIG. 11 illustrates in simplified schematic form an AS 6 having a Parlay X interface 7 and an Sh interface 8. Of course, the AS also possesses a SIP interface although this is not illustrated in the Figure. The AS comprises a processor or processors 9 configured to handle subscription requests (and notifications) and to handle the various interfaces. The processor(s) is (are) coupled to a storage location 10 in which subscriptions are stored.

Considering now the stopping of a subscription, e.g. subscription #1, a similar mechanism is employed. The service provider application sends a stop subscription request to any one of the set of ASs. That AS removes subscription #1 and updates the transparent in the HSS. The HSS then notifies the other ASs which then in turn remove subscription #1.

It will be appreciated by those of skill in the art that various modifications may be made to the above described embodiment without departing from the scope of the present invention.

The invention claimed is:

1. A method of starting a third party application subscription in Application Servers located within an IP Multimedia Subsystem network, the method comprising:
    receiving a subscription start request originating from a third party application server at one of said Application Servers including subscription data, wherein said subscription start request is received over a Parlay X interface;
    starting a subscription at said one of said Application Servers; and
    storing said subscription data as transparent data in a Home Subscriber Server from said one of said Application Servers over a Sh interface.

2. The method according to claim 1, further comprising distributing said subscription data from said Home Subscriber Server to others of said Application Servers over respective Sh interfaces.

3. The method according to claim 1, further comprising updating said subscription data in said Home Subscriber Server.

4. The method according to claim 1, wherein said Application Servers are configured to provide a specific IP Multimedia Subsystem service.

5. A method of stopping a third party application subscription previously started in Application Servers located within an IP Multimedia Subsystem network, the method comprising:
    receiving a subscription stop request originating from a third party application server at one of said Application Servers, wherein said subscription stop request is received over a Parlay X interface;
    deleting associated subscription data at said one of said Application Servers;
    stopping a subscription;
    updating transparent data in a Home Subscriber Server by sending an instruction from said one of said Application Servers to said Home Subscriber Server over a Sh interface to delete said subscription data; and
    deleting subscription data stored at others of said Application Servers by sending a notification from said Home Subscriber Server thereto over respective Sh interfaces.

6. The method of claim 5, wherein said method is performed by a processor executing instructions configured to carry out said method and wherein said instructions are stored on one or more non-transitory computer readable mediums.

7. Apparatus configured to operate as an Application Server within an IP Multimedia Subsystem, the apparatus comprising:
    a first interface for receiving a subscription start request originating from a third party application server including subscription data, wherein said subscription start request is received over a Parlay X interface;
    a memory and means for storing said subscription data in said memory, and means for starting a subscription; and
    a second interface for storing said subscription data as transparent data in a Home Subscriber Server over a Sh interface.

8. Apparatus configured to operate as an Application Server within an IP Multimedia Subsystem, the apparatus comprising:
    a first interface for receiving a subscription stop request originating from a third party application server, wherein said subscription stop request is received over a Parlay X interface;
    a memory for storing associated subscription data, means for deleting said subscription data from said memory, and means for stopping a subscription; and
    a second interface for deleting said subscription data stored as transparent data in a Home Subscriber Server over a Sh interface.

* * * * *

UNITED STATES PATENT AND TRADEMARK OFFICE
CERTIFICATE OF CORRECTION

PATENT NO. : 8,874,684 B2  Page 1 of 1
APPLICATION NO. : 12/865305
DATED : October 28, 2014
INVENTOR(S) : Holm et al.

It is certified that error appears in the above-identified patent and that said Letters Patent is hereby corrected as shown below:

In the Specification

In Column 2, Line 7, delete "(MMTeI)" and insert -- (MMTel) --, therefor.

In Column 2, Line 61, delete "MMTeI)" and insert -- MMTel) --, therefor.

In Column 4, Line 66, delete "MMTeI." and insert -- MMTel. --, therefor.

In Column 5, Line 11, delete "MMTEeI" and insert -- MMTel --, therefor.

In Column 5, Line 24, delete "MMTeI" and insert -- MMTel --, therefor.

In the Claims

In Column 6, Line 40, in Claim 7, delete "Apparatus" and insert -- An apparatus --, therefor.

In Column 6, Line 52, in Claim 8, delete "Apparatus" and insert -- An apparatus --, therefor.

Signed and Sealed this
Ninth Day of June, 2015

Michelle K. Lee
*Director of the United States Patent and Trademark Office*